US010498122B2

(12) United States Patent
Nassim

(10) Patent No.: US 10,498,122 B2
(45) Date of Patent: Dec. 3, 2019

(54) DEVICES, METHODS, AND SYSTEMS FOR MOUNTING DEVICES TO SURFACE STRUCTURES

(71) Applicant: Elias Nassim, Fort Lauderdale, FL (US)

(72) Inventor: Elias Nassim, Fort Lauderdale, FL (US)

( * ) Notice: Subject to any disclaimer, the term of this patent is extended or adjusted under 35 U.S.C. 154(b) by 73 days.

(21) Appl. No.: 16/173,096

(22) Filed: Oct. 29, 2018

(65) Prior Publication Data

US 2019/0069844 A1   Mar. 7, 2019

(51) Int. Cl.
*H02G 3/12* (2006.01)
*F24F 13/06* (2006.01)
*F24F 7/10* (2006.01)

(52) U.S. Cl.
CPC ............ *H02G 3/121* (2013.01); *H02G 3/12* (2013.01); *F24F 7/10* (2013.01); *F24F 13/06* (2013.01); *H02G 3/125* (2013.01)

(58) Field of Classification Search
CPC .......... H02G 3/08; H02G 3/081; H02G 3/121; H02G 3/123; H02G 3/125; H02G 3/10; H02G 3/12; H02G 3/14; H02G 3/266; H01H 23/04; H01H 9/02; H01H 9/0207; H01H 9/04; H01H 23/06; H01H 9/0264; H01H 13/04; H01H 13/06; H01H 13/10; F24F 7/10; F24F 7/00; F24F 2007/003; F24F 13/06; F24F 13/00
USPC .. 174/480, 481, 50, 53, 57, 58, 63, 61, 502, 174/491, 503; 220/3.2–3.8, 4.02; 248/906; 52/220.1, 220.8, 633, 663, 52/220.3; 454/184, 289, 330
See application file for complete search history.

(56) References Cited

U.S. PATENT DOCUMENTS

| | | | | |
|---|---|---|---|---|
| 7,423,215 B2* | 9/2008 | Cardenas | ............... | H02G 3/121 174/480 |
| 7,566,263 B2* | 7/2009 | Snyder | ................... | E04F 17/04 454/284 |
| 8,209,921 B2* | 7/2012 | Struthers | ................... | H02G 1/00 52/204.1 |
| 8,245,453 B2* | 8/2012 | Struthers | ................... | H02G 3/00 52/204.1 |
| 9,608,420 B1* | 3/2017 | Ferrara | .................... | H02G 3/14 |
| 9,705,297 B1 | 7/2017 | Nassim | | |
| 9,972,887 B1* | 5/2018 | Feiner | ................. | H01Q 1/2291 |

FOREIGN PATENT DOCUMENTS

WO   PCT/US17/36359   6/2017

* cited by examiner

*Primary Examiner* — Angel R Estrada

(57) ABSTRACT

Vent system for mounting to a surface structure such that a cover plate of the vent system is substantially flush with an outward facing surface of wallboard of the surface structure. At least one bracket is disposed between adjacent joists of a surface structure. A base plate includes a flange defining an adhesive bonding surface, a ring portion defining a recess, and a cuff. A cover plate is configured to be received within the recess. At least one magnet supported by the cover plate is for magnetically coupling the cover plate to the base plate. The vent assembly is configured to attach with the cuff. The joints, base plate, and cover plate are configured such that in an assembled configuration an outward facing surface of the cover plate is substantially flush with the outward facing surface of the wallboard.

20 Claims, 18 Drawing Sheets

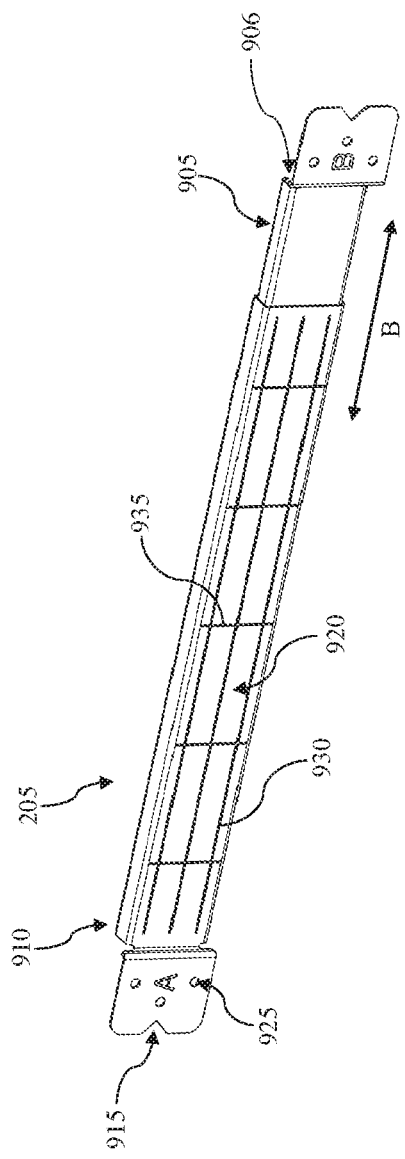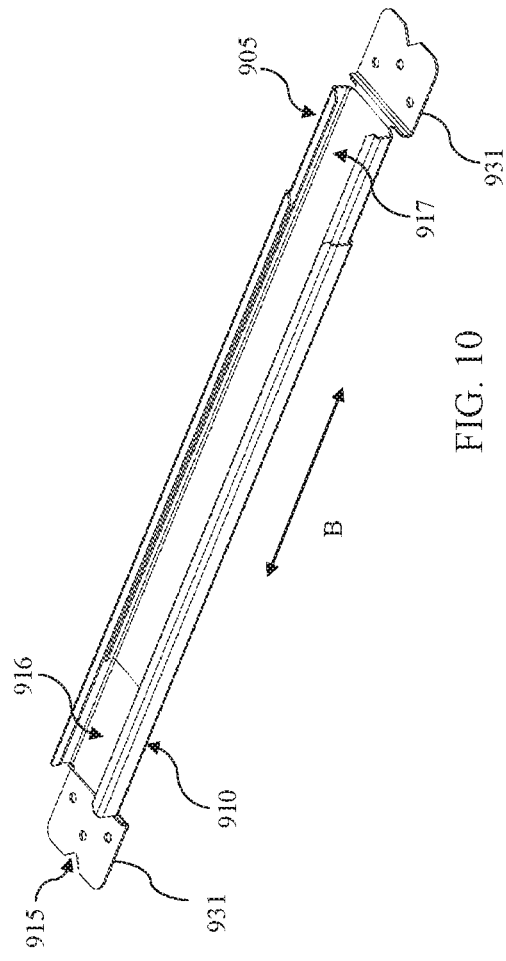
FIG. 9
FIG. 10

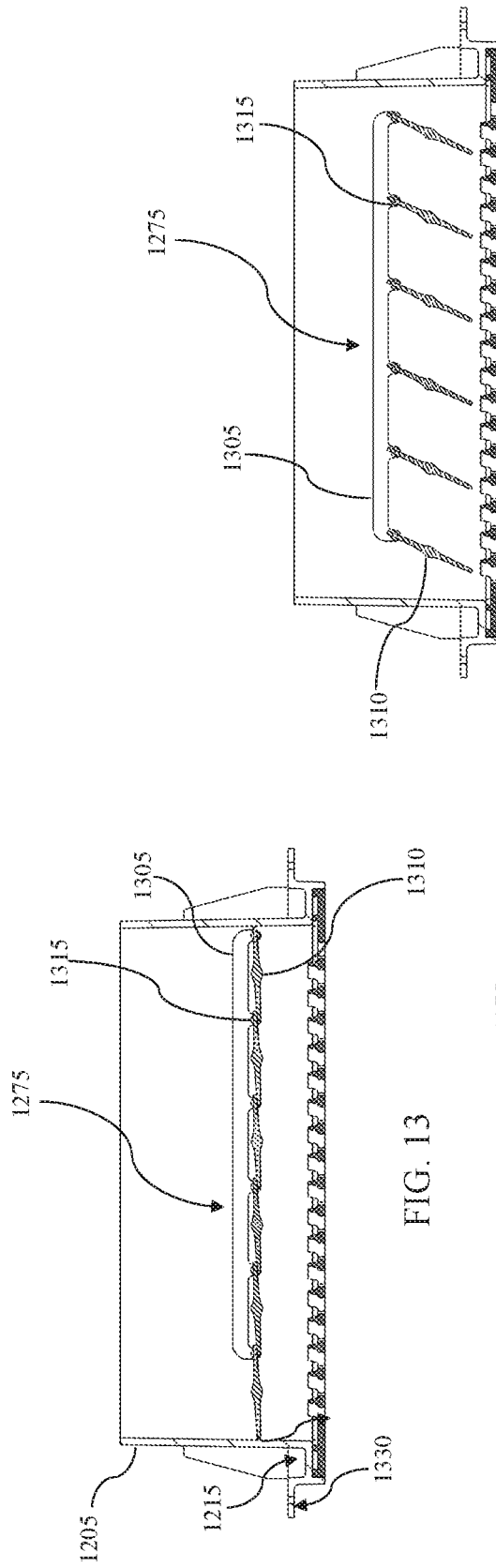
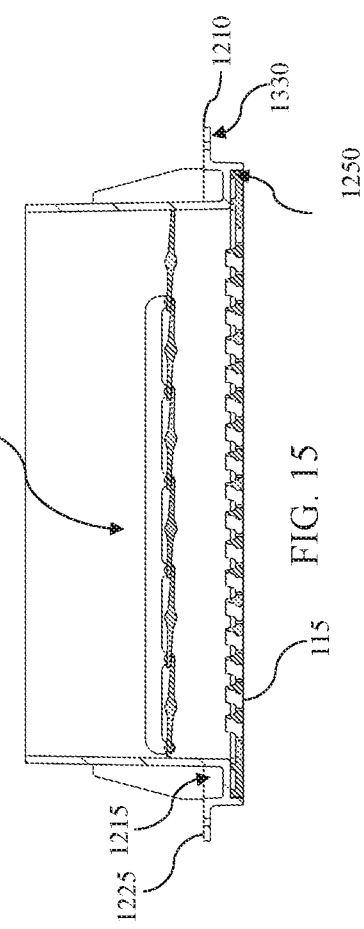
FIG. 13
FIG. 14
FIG. 15

DEVICES, METHODS, AND SYSTEMS FOR MOUNTING DEVICES TO SURFACE STRUCTURES

CROSS-REFERENCE TO RELATED APPLICATIONS

This application is a continuation in part and claims the benefit of PCT Application No. US17/36359 entitled "Devices, Systems, and Methods for Mounting Electrical Devices for Building Wall Constructions" and filed Jun. 7, 2017, which claims benefit of U.S. Non-Provisional patent application Ser. No. 15/331,420 entitled "Devices, Systems, and Methods for Mounting Electrical Devices for Building Wall Constructions," filed Oct. 21, 2016, now issued as U.S. Pat. No. 9,705,297, which claims benefit of U.S. Provisional Patent Application No. 62/346,981 entitled "Brackets and Base Plate for Electrical Outlet that is Flush with a Wall" and filed Jun. 7, 2016, the subject matter all of which is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates to mounting assemblies, and more particularly mounting devices for mounting vents and venting assemblies, registers, diffusers, and other A/C distribution vents where ductwork transitions to an outlet for a ventilations system, whether for cooling or heating or even general air circulation without a cooling or heating element.

BACKGROUND

When building and/or renovating structures such as residential homes or commercial buildings, it is desirable to provide aesthetically pleasing walls and ceilings. Such structures require duct work and vents for HVAC systems for providing heat and air conditioning. Typically, vents and venting assemblies are mounted to a ceiling or wall. These vents and venting assemblies are typically connected to ducts ducting which are mounted to joints behind the ceiling or flooring. Typically, the outward facing surface of the vents or venting assemblies extend outward to cover the opening in the wall in which the vents and venting assemblies are mounted. This results in a visible and aesthetically displeasing appearance.

In high end homes and buildings, large sums of money are spent decorating the interior. Visible and aesthetically displeasing vents and vent assembles create problems for interior designers. As a result, there exists a need for improvements over the prior art and more particularly, an apparatus or means to reduce the visibility of the vents and venting assembles relative to the wall or ceiling surface.

SUMMARY

Devices, methods and systems for mounting venting devices for building surface structures is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a vent system is disclosed. The vent system is for mounting to a surface structure. The surface structure including joists and wallboard attached to the joists. A vent assembly is configured to be in attachment with the vent system and surface structure such that a cover plate of the vent system is substantially flush with an outward facing surface of the wallboard. The vent system includes at least one bracket disposed between adjacent joists of a surface structure. The system includes a base plate having a flange defining an adhesive bonding surface, a ring portion defining a recess, and a cuff. A cover plate is configured to be received within the recess of the base plate. At least one magnet supported by the cover plate magnetically is configured for coupling the cover plate to the base plate. The vent assembly is configured to be in attachment with the cuff of the base plate. The joints, base plate, and cover plate are configured such that in an assembled configuration, where the wallboard is attached to the joists, an outward facing surface of the cover plate is substantially flush with the outward facing surface of the wallboard.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 9 is a first perspective view of a bracket of the vent system, according to an example embodiment;

FIG. 10 is a second perspective view of the bracket of the vent system, according to an example embodiment;

FIG. 13 is a side cross-sectional view of the base plate illustrating a vent assembly in attachment with the cuff of the base plate, wherein a vent assembly is in a first closed configuration, according to an example embodiment;

FIG. 14 is a second side cross-sectional view of the base plate illustrating a vent assembly attached to the cuff of the base plate, wherein the vent assembly is in an open configuration, according to an example embodiment;

FIG. 15 is a side cross-sectional view of the base plate illustrating a vent assembly attached to the cuff of the base plate, wherein the vent assembly is in a second closed configuration, according to an example embodiment;

DETAILED DESCRIPTION

Figure 1:
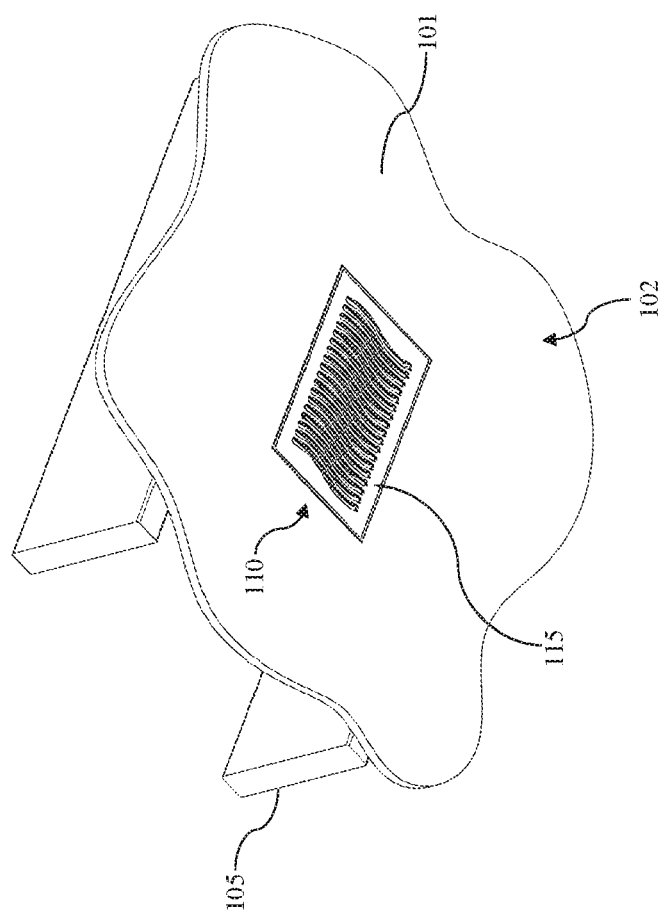
FIG. 1 is a front perspective view of a vent system in the fully assembled configuration in attached with wallboard and joists, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing devices, methods and systems such that a vent assembly is configured to be in attachment with the vent system and surface structure such that a cover plate of the vent system is substantially flush with an outward facing surface of the wallboard. The present invention improves over the prior art by providing a cover plate assembly that is magnetically coupled to the base plate, which allows a user to easily remove the cover plate so that a user may easily clean dirt and debris from the cover plate. The present invention also provides an improvement over the prior art by allowing a user to easily change the cover plate with any number of other cover plates, with each having a unique vent pattern. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
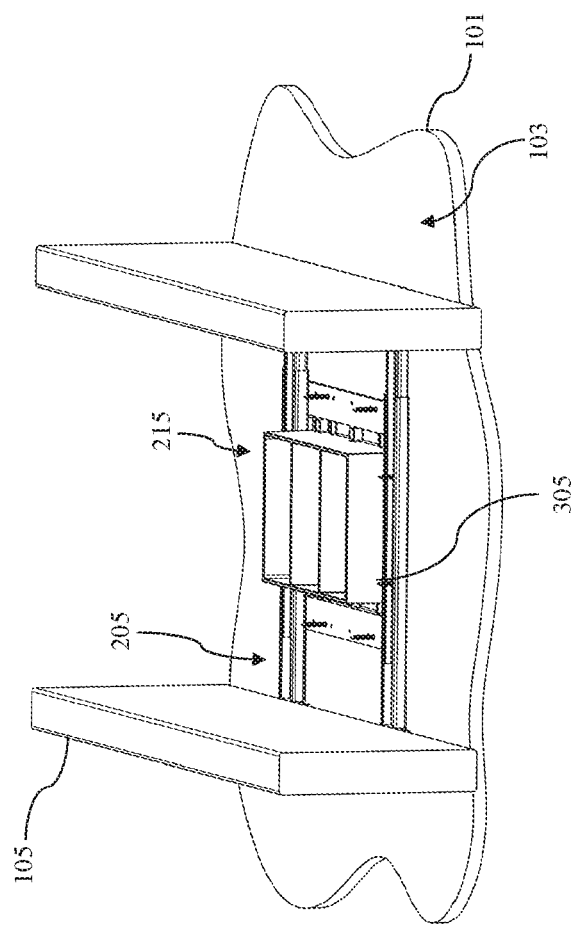
FIG. 2 is a rear perspective view of the vent system in the fully assembled configuration in attached with wallboard, brackets and joists, according to an example embodiment.
Figure 3:
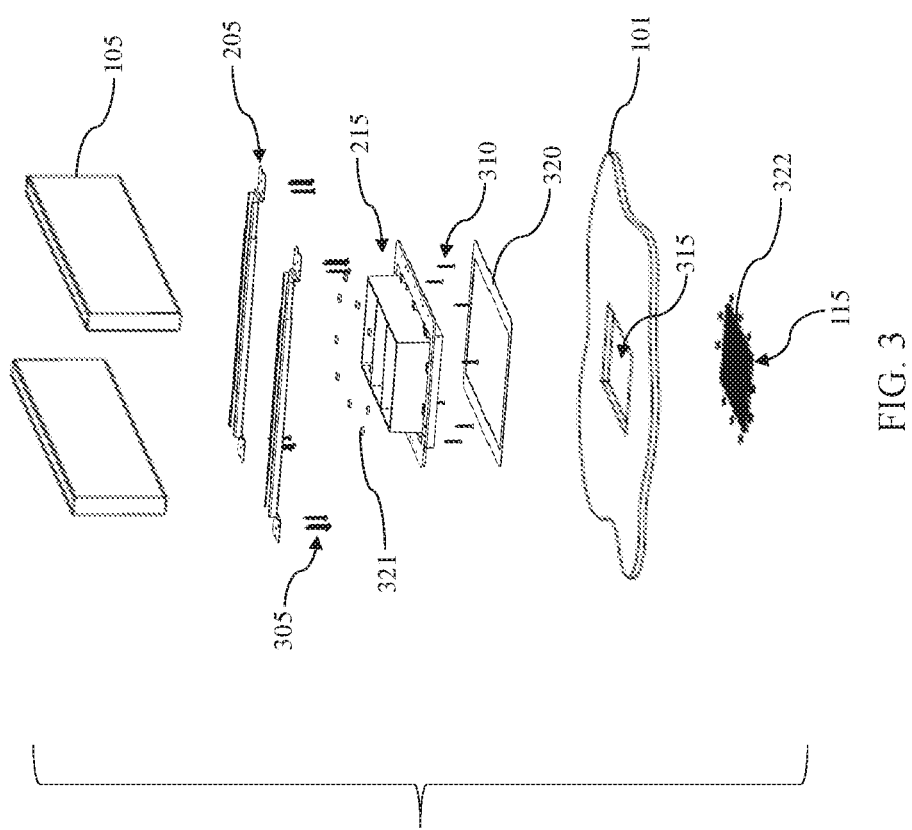
FIG. 3 is an exploded perspective view of the vent system, according to an example embodiment.
Figure 4:
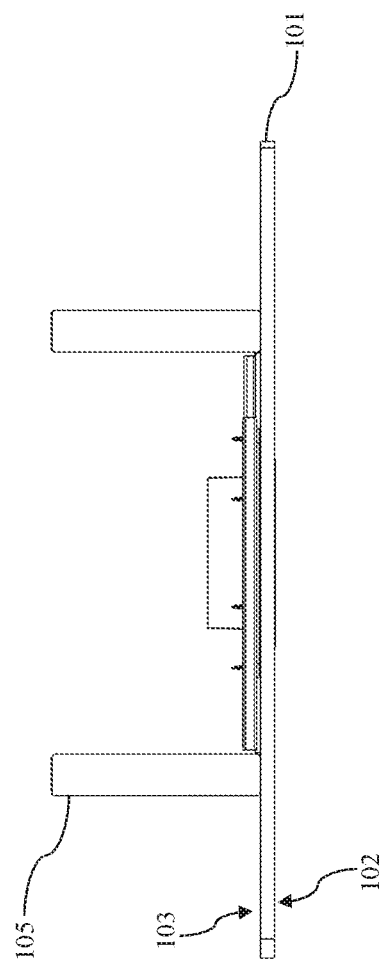
FIG. 4 is a side view of the vent system in the fully assembled configuration in attached with wallboard and joists, according to an example embodiment.
Figure 5:
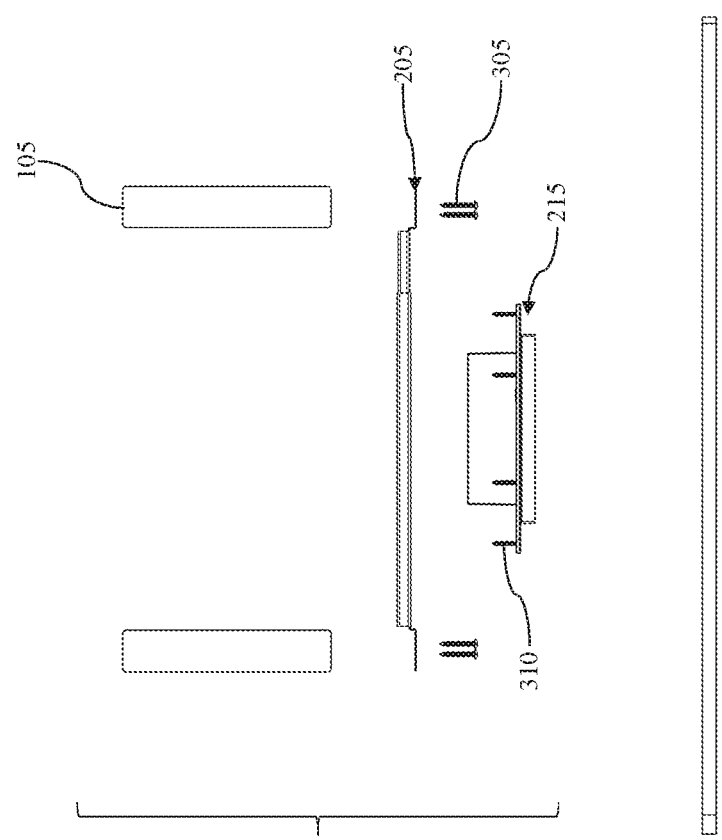
FIG. 5 is an exploded side view of components of vent system, according to an example embodiment.

Referring now to the figures, the figures, whether ever possible, will be discussed together and where necessary, specific figures will be discussed to further explain elements of the vent system. FIG. 1 is a front perspective view of a vent system 110 in the fully assembled configuration in attached with wallboard 101 and joists 105, according to an example embodiment. FIG. 1 illustrates that in one embodiment the surface structure may include joists 105 with wallboard 101 attached to the joists. FIG. 2 is a rear perspective view of the vent system in the fully assembled configuration in attached with wallboard, brackets 205 and joists, according to an example embodiment. FIG. 3 is an exploded perspective view of the vent system, according to an example embodiment. As illustrated in the figures, in one embodiment, the surface structure may be a ceiling having a support or frame structure. However, in other embodiments, the surface structure may also define a floor, wall or other surface that have vent assemblies in connection with a vent system or HVAC system.

Ceilings and other types of surface structures are typically constructed of structural members. These structural members may be arranged as a series of spaced joists, studs or other frame members which may be covered by wallboard. In the present embodiment, the term joist may be defined as a support member to which wallboard may be attached. In one embodiment, wallboard 101 is a building board made for surfacing ceilings and walls, often referred to as "drywall" or "sheetrock." Wallboards are often made into large rigid panels that are fastened to the frame of a building to provide a surface finish. The wallboard has a generally planar shaped body comprising an outward facing surface 102 and an inward facing surface 103. The outward facing surface is configured to face outward and toward a room or other open area adjacent to the surface structure and the inward facing surface is configured to face inward away from the room. It is highly desirable to have an outward facing surface that is aesthetically pleasing. The outward facing surface of the wallboard may be painted, covered, include decorative elements and otherwise adapted to be aesthetically pleasing.

Although the portion of the wallboard depicted in the FIG. 1 is substantially flat, those skilled in the art will appreciate that the structure could be curved, slanted, or have curved/slanted portions in any direction. Wallboard materials include plywood and wood pulp, asbestos-cement board, and gypsum. However, it is understood that other materials may be used that are within the scope present invention.

Typically, wallboard is installed with the aid of a floor-mounted drywall supporting jack that can hold a wallboard panel in a horizontal position and lift it into place against the ceiling joists 105 to which it is to be attached. A joist is a horizontal structural member that is typically arranged in parallel series to support the structure of a ceiling or floor. For other surface structures such as walls, the support structure may include a wall stud or stud. A wall stud is a vertical framing member in a building's wall of smaller cross section than a post. They are a fundamental element in frame building. Attachment is usually carried out by the use of drywall screws or nails, and, optionally, an adhesive may be used to cement the wallboard panels to overhead joists to reduce vibration. Joists materials include wood, engineered wood, and steel. However, it is understood that other materials may be used that are within the scope present invention. In other embodiments, if the surface structure is a wall, the surface structure may include vertical frame members or studs having wallboard or drywall attached to the vertically aligned frame members.

A vent assembly 1275 with moveable louvers, illustrated in FIGS. 13-15 and further explained below, is configured to be in attachment with the vent system 100 and surface structure such that a cover plate 115 of the vent system is substantially flush with an outward facing surface 102 of the wallboard (further explained below).

The vent system includes at least one bracket 205 disposed between adjacent joists of the surface structure. FIG. 9 is a first perspective view of a bracket 205 of the vent system, according to an example embodiment and FIG. 10 is a second perspective view of the bracket 205 of the vent system, according to an example embodiment. The bracket has an elongated rectangular shaped body and includes a first part 905 and a second part 910 that are slidably coupled to each other. The bracket is sized and shaped to permit the first and second part to slide with respect to each other (in the direction of double arrowed line B) so that they can extend or retract to fit between joists, studs or frame elements of various spacings. For example, while typical joist spacing in residential building construction is 16 inches on center, some structures require joist spacing to be 12 or 24 inches apart on center. The bracket of the vent system would be able to fit between numerous sizes of joint spacing. The bottom end of the first part of the bracket includes two inner struts that extend in a substantially parallel relationship to form an elongated channel. The bottom end of the second part of the bracket includes a curved or folded over portion sized and configured so as to be in sliding relationship with the first part of the bracket and to slide within the periphery of the channel on the first part of the bracket. Thus, the second part of the bracket can slide with respect to the first part of the bracket while being retained in vertical and horizontal directions.

More specifically, the second part of the bracket 910 can have a C-channel section 916 that is sized and shaped to slidingly receive a smaller C-channel 917 of bracket 910. As such, the first part of the bracket 905 can slide with respect to the second part of the bracket 910 while also being retained in the vertical and horizontal directions. In addition, the C-channels themselves provide rigidity against bending in both the vertical and horizontal directions. As discussed in more detail below, the rigidity in the horizontal direction is useful in helping maintain the vent system in position with respect to the wall board 101. In addition to the C-channels 916, 917, the brackets can be provided with additional bends, ridges, etc. that increase the rigidity of the brackets.

Figure 17:
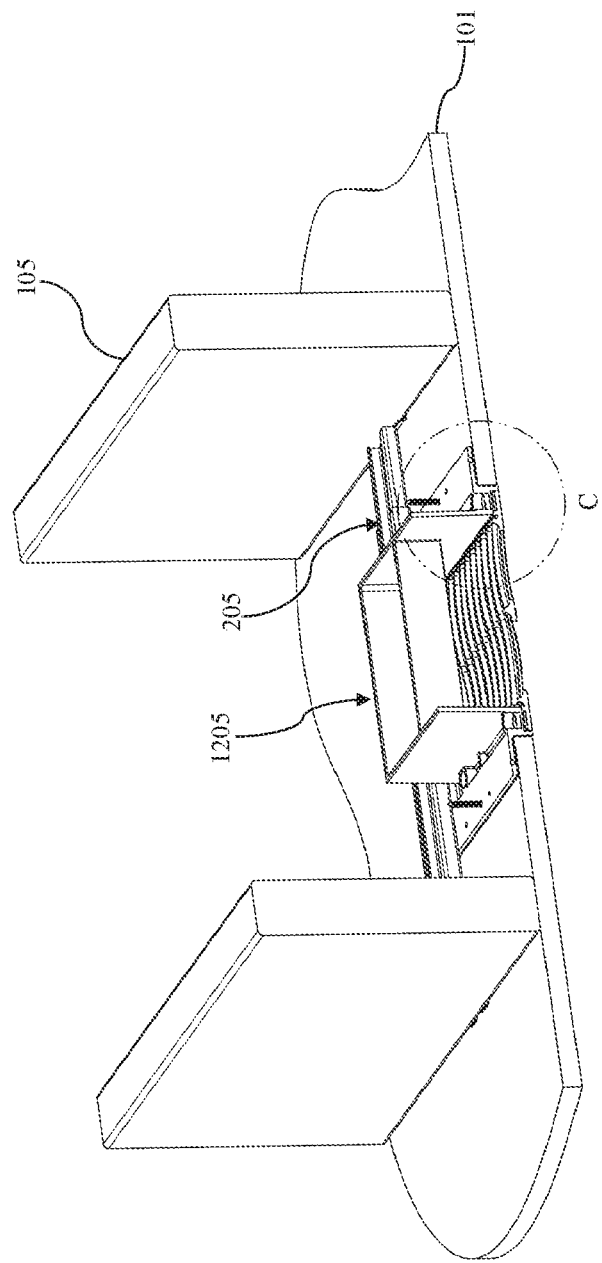
FIG. 17 is a perspective cross-sectional view of the vent assembly in the fully assembled configuration and in attachment with brackets, wallboard and joists, according to an example embodiment.

The first part 905 and second part 910 of the brackets can includes a flanged portion 931 or joist attaching portion that can rest against the frame element or joist 105 with the first portion and second portion of the bracket extending therebetween (as illustrated in FIG. 17). The figures illustrate in embodiments for use with a ceiling. However, it is understood that the brackets may be adjusted for fitting in between the frame elements of floors and walls. As illustrated in FIGS. 2, 3 5 and 17, with the brackets extended between the joists 101, fasteners 305 can be used to attach the first part and second part of the bracket to the stud via flanged portions 931 or joist attaching portion.

Typically, a user selects the desired location for the mounting of the vent system and attaches the first portion to the second portion. The first and second part of the bracket include a notch 915 on opposite ends that serves as a reference point when adjusting the length of the brackets. Once the brackets are extended between adjacent joists and positioned at the desired length, fasteners 305 are used to attach the brackets to the joists via a series of openings 925 located on the ends of the first part and second part of the bracket. The bracket provides a rigid mounting surface 920 for mounting the base plate, and horizontal 930 and vertical 935 line markings or score lines to help ensure precise placement of the brackets in horizontal and vertical alignment. The rigid mounting surface is offset a certain distance 906 from the joist attaching portion such that when the base plate is attached to rigid mounting surface, the outward facing surface of the cover plate is flush with the outward facing surface of the wallboard. It should be understood that the dimension of the offset may be adjusted according to the dimensions of the wallboard and other components of the vent system.

The vent system includes a base plate 215. The base plate has a flange 1210, a ring, or mud ring portion 1225 defining a recess 1250, and a cuff 605. FIG. 2 shows the base plate attached to a pair of brackets. The base plate is configured for allowing the cover plate to magnetically coupled to the base plate such that in the fully assembled configuration the vent system is such that the outward facing surface of the cover plate 116 is substantially flush with the outward facing surface 102 of the wallboard and ring portion(such as illustrated in FIGS. 4, 17, 18 and 19 and that will be more fully explained below.

Figure 6:
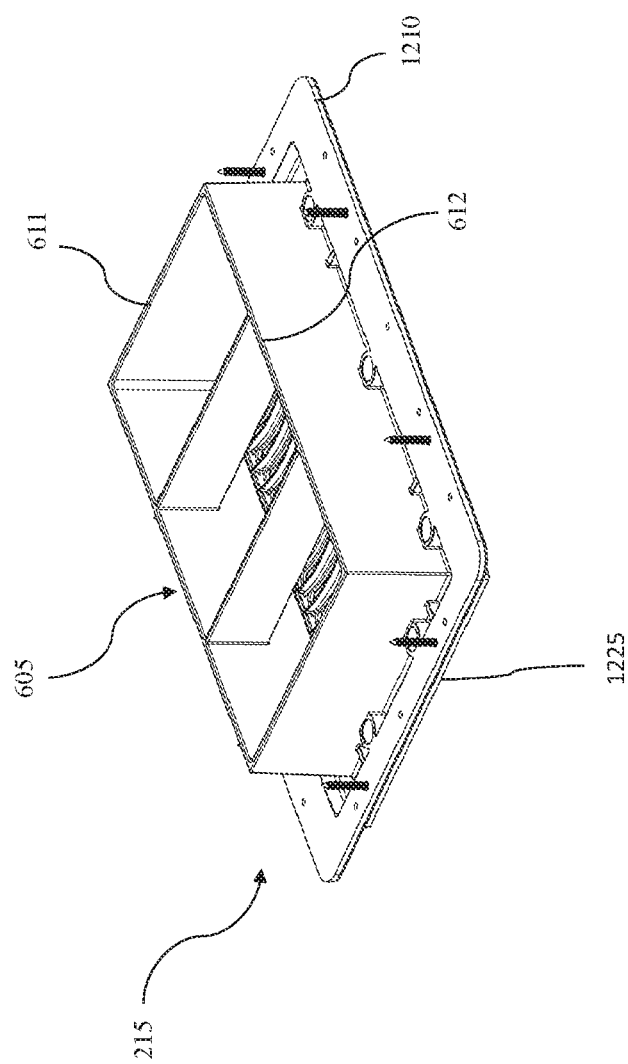
FIG. 6 is a perspective view of a base plate assembly of the vent system, according to an example embodiment.
Figure 7:
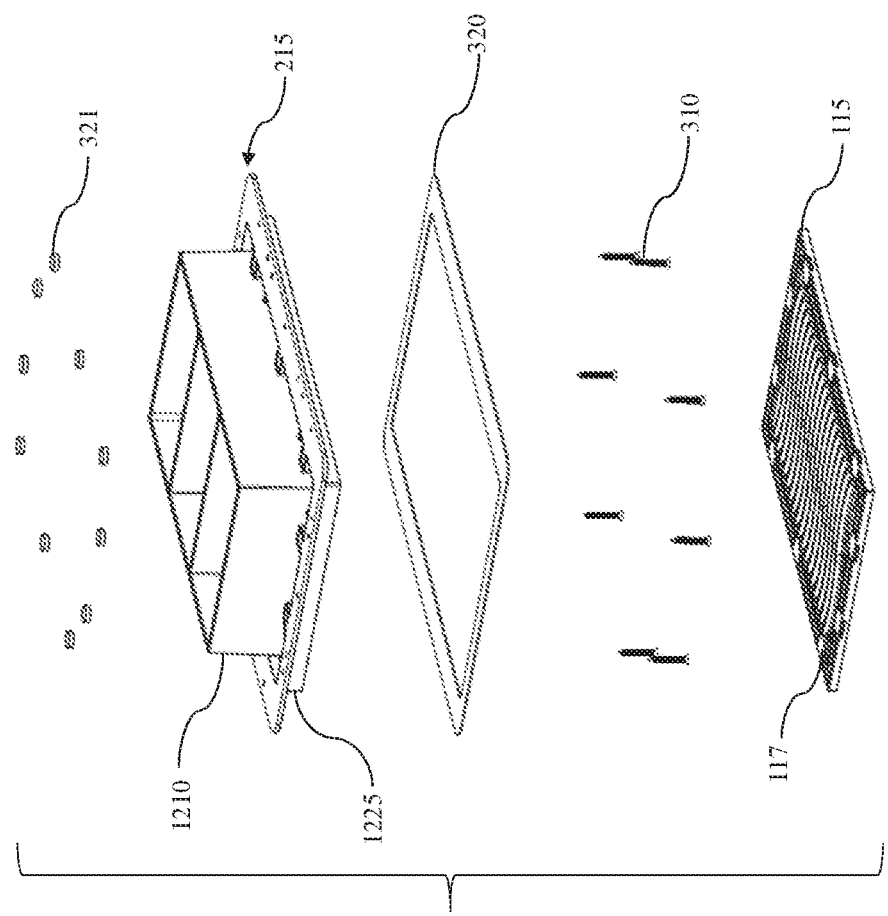
FIG. 7 is an exploded view of certain base plate assembly components of the vent system, according to an example embodiment.

As is best seen in FIG. 6, in the present embodiment, the base plate is substantially rectangularly shaped. However, other shapes may also be within the spirit and scope of the present invention. The base plate defines a cuff 605. The cuff is a substantially rectangular shaped wall body defined by two generally parallel opposing side walls 611 and two generally parallel end walls 612, that define the rectangular cuff having an interior portion surrounded by the walls 611, 612. The ductwork slides over the cuff and is screwed into the cuff for means of attachment. The interior portion allow air to flow through the base plate. The vent assembly may be attached to the rectangular shaped interior portion of base plate (the vent assembly is more particularly illustrated in FIGS. 13-15 and further explained below).

The base plate also defines a flange or flanged portion 1210. The flange extends outward and perpendicular to the walls 611, 612 that define the cuff. The flange 1210 provides an increased surface area for receiving adhesive 320 so that the wallboard can be bonded to the flange (best seen in FIG. 18). In the present embodiment, when adhesive is applied to the adhesive bonding surface of the flange, adhesive bonds to the inward facing surface 103 of the wallboard when the vent system is in the assembled configuration. The flange is configured such that at least substantially all of the vent assembly is attached to the vent system above the wallboard when the vent system is in the fully assembled configuration.

Figure 12:
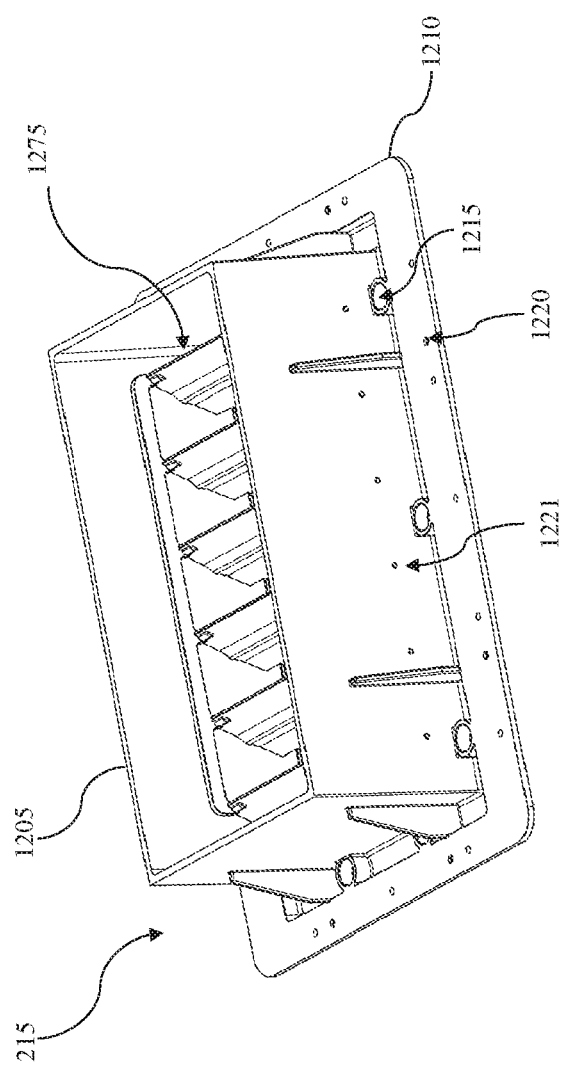
FIG. 12 is a perspective view of the base plate of the vent system with louvers, according to an example embodiment.

As shown in FIG. 12, the flange includes a set of holes 1220 spaced along the flange of the base plate. Each of the holes 1220 is configured for receiving a fastener 310 configured for attaching the flange to at least the wallboard. Additional holes spaced along the flange of the base plate serve to allow excess adhesive to ooze out from the holes and/or receive supplementary fasteners. The adhesive can be a liquid/gel-type adhesive (e.g., such as a typical glue, adhesive, epoxy, etc.) that is applied along the flange on the adhesive bonding surface 1330 (best illustrated in FIG. 18).

In one embodiment, the base plate also defines cutouts 1215. In the present embodiments, each cutout is a substantially circular shaped opening is configured to receive either a magnetic element or a magnetically responsive or attaching element 321 that will be used to couple with a mating magnetic element or a magnetically responsive or attracting element 322 that is to be inserted into the slot 805 of the cover plate (as further explained below and more particularly illustrated in FIG. 18. A magnetically responsive or attracting element is understood to mean a material (such as ferromagnetic materials like iron and things that contain iron, such as steel) that couples with a magnetic or magnetic element. Each cutout 1215 is configured such that each slot 805 on the cover plate aligns with each cutout on the base plate. The cutouts may be hollow and may be composed of multiple parts, or it may be molded, cast, or otherwise created as a single piece, and such variations are within the spirit and scope of the claimed invention.

In one embodiment, the base plate also defines a ring, or mud ring portion 1225. The ring portion is concentrically aligned with the cuff. The ring portion is a wall shaped body protruding downward and perpendicular to the flange portion. The height of the ring portion may be configured depending on the thickness of the wallboard. For example, wallboards having a greater thickness may have a larger ring portion. The ring portion is configured to abut an edge of the opening 315 in a surface structure as illustrated in the figures.

A recess 1250 is defined by the ring portion. The recess positioned inwardly from the ring portion and is configured for receiving the cover plate 115 when the vent system is in the fully assembled configuration. In the present embodiment, when in the fully assembled configuration, the recess is sized such that when the cover plate is received by the recess, the outward facing surface 116 of the cover plate is substantially flush with the outward facing surface 102 of the wallboard. Additionally, during the installation process, the recess is also configured for receiving a masking plate, or otherwise referred to as a mud plate, further explained below.

Figure 8:
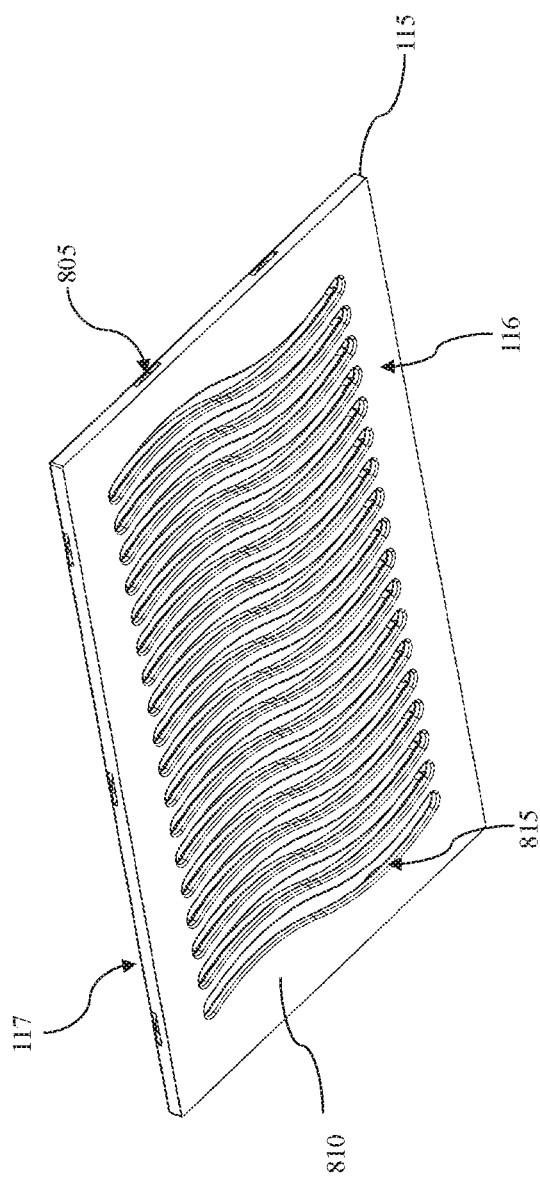
FIG. 8 is a perspective view of a cover plate of the vent system, according to an example embodiment.
Figure 18:
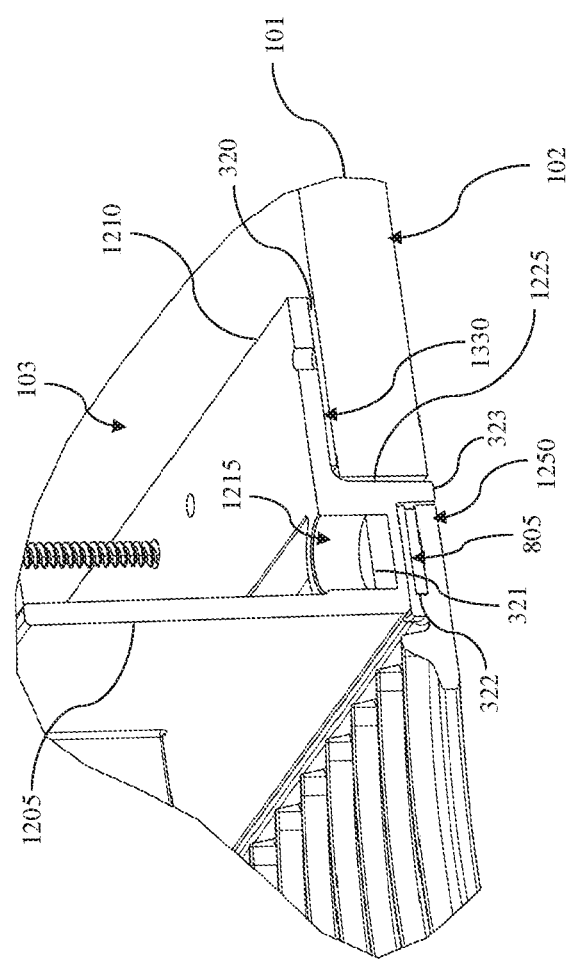
FIG. 18 is an enlarged perspective cross-sectional view of a portion of the area enclosed within circle C of FIG. 17, according to an example embodiment.

The vent system also includes the cover plate 115 configured to be received within the recess. FIG. 8 shows a perspective view of a cover plate of the vent system, according to an example embodiment. The cover plate has a generally planar rectangular shaped body and comprises an outward facing surface 116 and an opposing inward facing surface 117. FIG. 8 illustrates the cover plate defines a plurality of elongated slots 815 through which air may pass between. The cover plate is sized and shaped to be received within the recess with an outward facing surface seated flush with the edge 323 of the base plate ring portion and, as such, flush with the outward facing surface 102 of the wallboard (as illustrated in FIG. 18, for example). In addition, the cover plate can be sized and shaped to be received within the recess in a tight configuration in order to reduce the size of any gaps between the cover plate and the ring portion. The reduction of any seams enhances the overall aesthetic appearance between the wallboard and the cover plate.

The present invention improves over the prior art by providing a cover plate that is magnetically coupled to the base plate, which allows a user to easily remove the cover plate so that a user may easily clean dirt and debris from the cover plate. Additionally, the flush appearance of the base plate relative to the outward facing surface of the wall board when in the fully assembled configuration provides a much more aesthetically pleasing system, especially for high-end and discerning customers.

The cover plate includes slots 805 configured for receiving a magnet or magnetically responding element 322 to magnetically couple the cover plate to the base plate. The slots are located on the sides of the cover plate and are not visible from the outward facing surface of the cover plate. The use of magnets eliminates the need for traditional fasteners (e.g., screws or bolts) that typically remain visible and detract from the aesthetic appearance of a cover plate. Magnets may be made of any permanently magnetized substance such as neodymium or other rare earth minerals, ferrous materials such as steel and other iron alloys, or as synthetic resins impregnated with particles of magnetic material, however, it is understood that other materials may be used that are within the scope present invention. The size and number of slots, together with the corresponding magnets or magnetically responding elements, may be adjusted depending on the size of the application and size of the system.

As previously mentioned, the base plate 215 includes cutouts 1215 containing magnetically responsive material or magnets, wherein each cutout on the base plate aligns with the slots on the cover plate so that the magnets and magnetic response material can provide a magnetic holding force between the cover plate and the base plate. Thus, the cover plate can be magnetically mounted to the base plate and can be decoupled from the base plate upon application of a force sufficient to overcome the magnetic coupling force. The cover plate can have a reduced thickness in the area of the slots to prevent interference with the magnetic coupling force between the magnets or magnetic responsive element on the cover plate and the magnets or magnetically responsive material on the base plate. Accordingly, when the cover plate is installed, the magnets or magnetic responsive elements are fully hidden from exterior view and therefore do not detract from the exterior aesthetic appearance of the cover plate.

The moveable vent system, as opposed to the fixed vent system shown in FIG. 6, also includes a vent assembly 1275 configured to attach to the cuff of the base plate. FIGS. 12-16 illustrate different views of the base plate of the vent system. A base plate is part of a building's heating, ventilation, and air conditioning (HVAC) system. As shown in FIGS. 12-15, the base plate may have a vent assembly that includes a plurality of moveable louvers 1310 to balance and control the amount and direction of air flow going into a room from heating and cooling systems. A louver has a generally planar blade-like configuration comprising two parallel side edges, and two generally parallel end edges. Each louver includes a pair of integrally formed pins 1605 that are offset from the major plane of the louver and extend beyond the ends thereof. The louver pins are substantially cylindrical in shape and configured to be received into corresponding openings 1221 located on opposite ends of the cuff for selectively seating and unseating the louvers. The louvers can be pivotally connected to the cuff of the base plate in a side by side parallel arrangement, extending substantially the full distance between two opposite ends of the cuff. This type of application assures a tight fit and smooth operation of the louvers.

Figure 16:
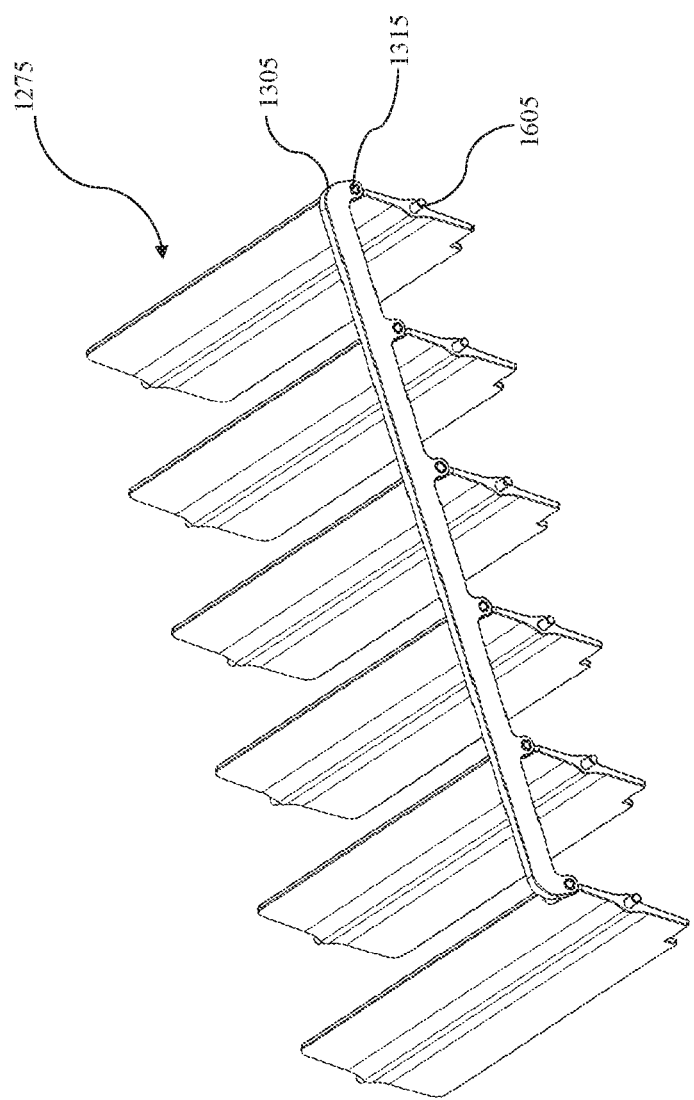
FIG. 16 is a perspective view of components of the moveable vent assembly, wherein the vent assembly is the open configuration, according to an example embodiment.

Additionally, each louver includes an integrally formed edge pin 1315 that is offset from the major plane of the louver and extends beyond the corner end thereof. The edge pin is substantially cylindrical in shape and configured to be received into the corresponding opening located on the lever. The lever is substantially rectangular in shape comprising two parallel side edges, and two generally parallel end edges. The lever includes a plurality of equally spaced ridges extending outwardly from the side edge of the lever. Each ridge contains an opening configured to receive a louver edge pin. As illustrated in FIG. 16, a plurality of louvers can be attached to a lever, or link 1305 for simultaneous opening or closing access to the air duct for airflow management.

Louvers can be adjusted manually and individually to provide air deflection at varying angles in both horizontal and vertical planes. FIG. 13 illustrates a cross-sectional view the vent assembly in a first closed configuration, wherein a plurality of louvers are horizontally aligned in an overlapping arrangement to block airflow. FIG. 14 shows a cross-sectional view of the vent assembly in an open configuration, wherein the louvers are vertically aligned in a side by side parallel arrangement to allow maximum airflow. FIG. 15 shows a cross-sectional view of the vent assembly in a second closed configuration, wherein a plurality of louvers is horizontally aligned in an overlapping arrangement to block airflow. However, it is understood that other vent assemblies may be used and are within the spirit and scope of the present invention.

Figure 11A:
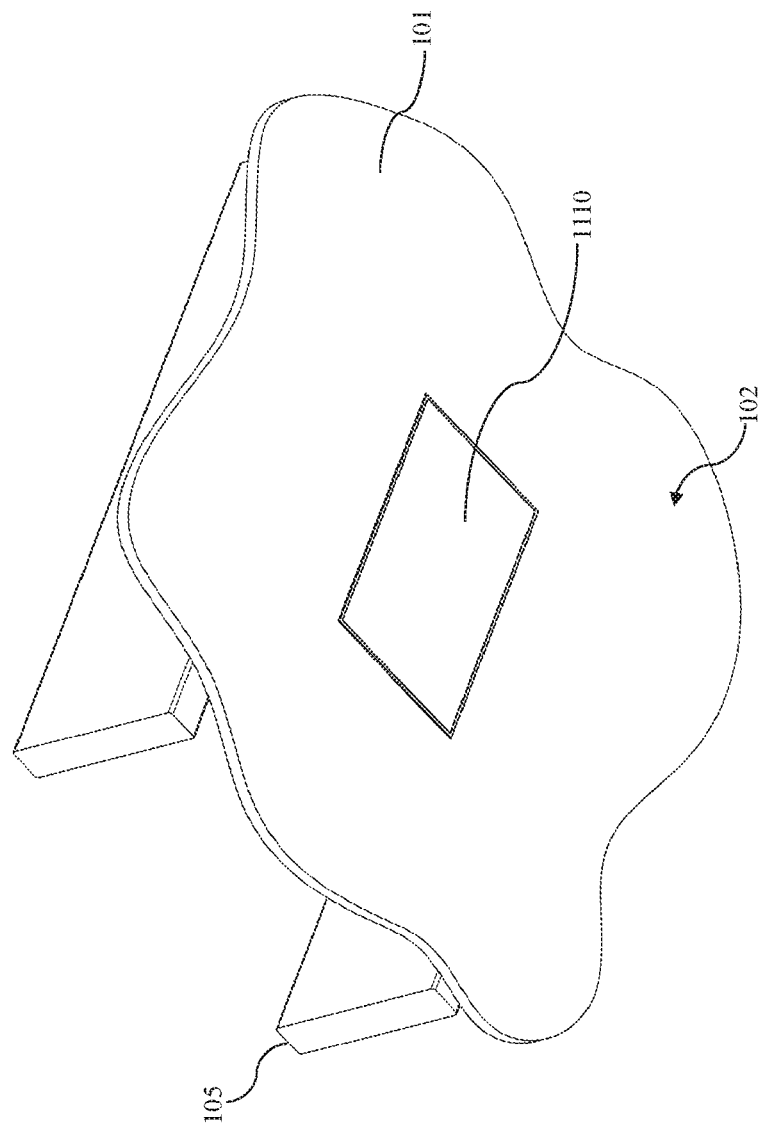
FIG. 11A is a front perspective view of a mask plate of the vent system in attached with wallboard and joists, according to an example embodiment.

A masking plate 1110 may also be used during the installation process of the vent system. FIG. 11A shows a front perspective view of the masking plate 1110 provided for installation of the vent assembly. The masking plate protects the base plate during the joint compound application process. A masking plate is typically used to cover holes, or openings on a surface. The masking plate comprises a generally planar surface, that is sized and shaped like the cover plate, to be received within the recess, and the outer surface seated flush with the wallboard.

During installation of the vent system to the wallboard, the masking plate is received within the recess 1250 in place of the cover plate, and the trowel used for the application of joint compound (e.g., spackle, plaster, mud, etc.) is dragged along the edge of the ring portion 1225 of the base plate 205 such that the joint compound can be feathered into the surrounding wallboard. The joint compound covers any fasteners, seams, or imperfections to provide a substantially smooth, flush, and seamless transition between the wallboard and the cover plate. After the joint compound has been applied and finished, the masking plate is removed from the recess and discarded. Thereafter, paint is applied on the wallboard such that it extends between at least a portion of the wallboard and the cover plate to reduce the aesthetic impact of the cover plate being included in the wall. The cover plate is then inserted into the recess and magnetically coupled to the base plate via magnets. The present invention overcomes the shortcomings of the prior art by providing a substantially smooth, flush, and seamless transition between the wallboard and the cover plate as illustrated in FIG. 1, which illustrates no opening or crack between the edge 323 of the ring of the base plate and the wallboard.

FIG. 17 is a perspective cross-sectional view of the vent system in a fully assembled configuration attached to the wallboard 101 and joists 105. A bracket is attached between adjacent joists on the ceiling and the base plate is attached to the mounting surface of the bracket. The rigid mounting surface is offset from the joist attaching portion such that when the base plate is attached to the rigid mounting surface using fasteners, the outward facing surface of the cover plate is flush with the outward facing surface of the wallboard.

FIG. 18 is an enlarged perspective cross-sectional view of a portion of the area enclosed within circle C of FIG. 17, according to an example embodiment. The flange 1210 of the base plate provides an increased surface area portion or adhesive boding surface 1330 for receiving adhesive. In FIG. 18, adhesive 320 is disposed on the adhesive bonding surface so that the inward facing surface of the wallboard is bonded to the flange. The adhesive provides a strong mechanical bond between the base plate and the wallboard. The flange includes a plurality of cutouts 1225 configured to receive a magnet or magnet responsive element 321. Each cutout is configured such that each slot 805 on the cover plate aligns with each cutout 1225 on the base plate. The cover plate is positioned inside the recess 1250 and magnetically coupled to the base plate via magnets or magnetic responsive elements found on the slots 805 of the cover plate. The cover plate is sized and shaped to be with an outward facing surface is seated flush with the edge 323 of the base plate ring portion and, as such, flush with the wallboard. Additionally, joint compound may be applied to cover any fasteners, seams, or imperfections to provide a substantially smooth, flush, and seamless transition between the wallboard 101 and the base plate 215 (as illustrated in FIG. 1).

Figure 19:
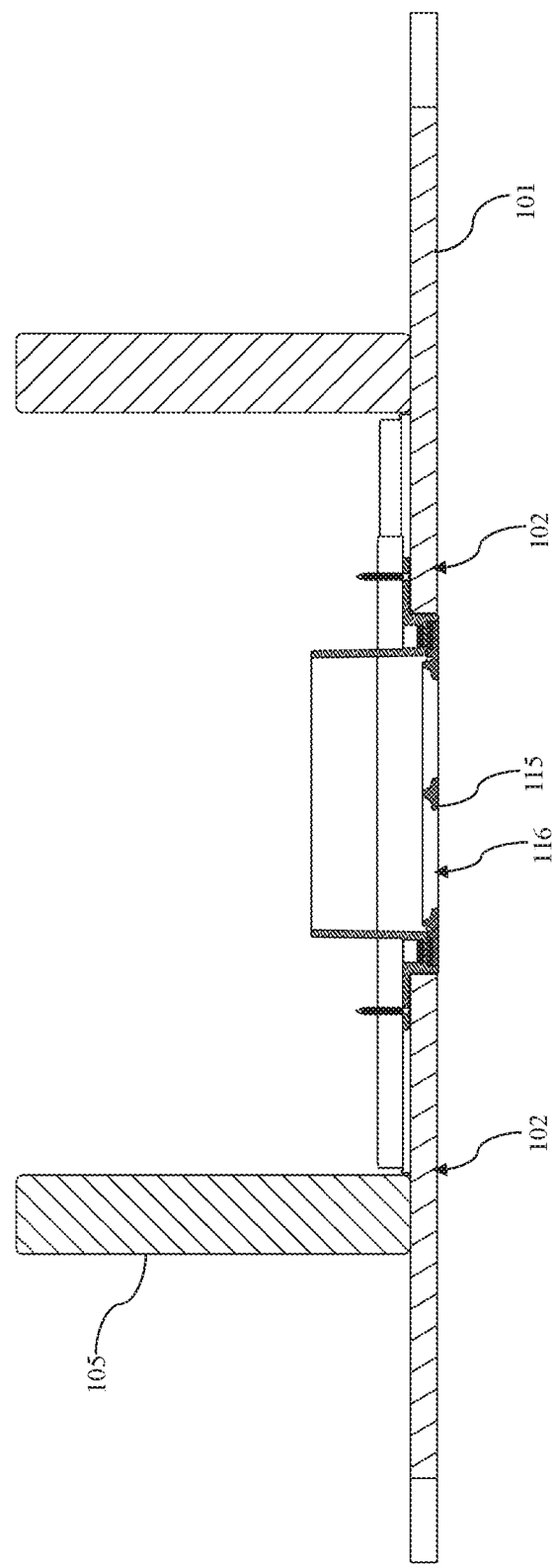
FIG. 19 is a side cross-sectional view of the vent assembly in the fully assembled configuration and in attachment with brackets, wallboard and joists, according to an example embodiment; and, FIG. 20 is a front view of a cover plate having a second pattern, according to an example embodiment.

FIG. 19 is a side cross-sectional view of the vent system in the fully assembled configuration and in attachment with brackets, wallboard and joists, according to an example embodiment. The rigid mounting surface is offset from the joist attaching portion such that when the base plate is attached to the rigid mounting surface using fasteners, the outward facing surface of the cover plate is flush with the outward facing surface of the wallboard.

Figure 20:
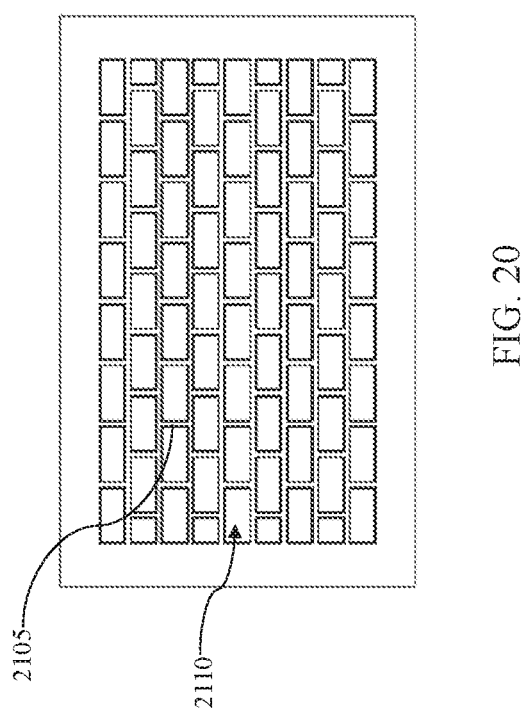

FIG. 20 shows a front view of a cover plate having a second pattern of openings for allowing flow of air through the vent system, according to an example embodiment. The outward facing surface of the cover plate forms the visible portion of the cover plate. The present invention provides an improvement over the prior art by allowing a user to easily change the cover plate with a second cover plate that can accommodate a wide range of interior and exterior applications in residential, commercial, industrial, educational, and healthcare settings. In one example, an alternate cover plate is provided. The cover plate has a generally planar surface comprising a plurality of rectangular shaped openings 2110, based between structure or frame elements 2105 defining a rectangular shaped pattern. It is understood that numerous patterns may be used for the openings and frame elements of the cover plate. It is also understood that it is within the spirit and scope of the present invention that the cover plate may have different shapes, sizes, ornamental features, textures, finishes, and designs.

Operationally, in one embodiment, the present invention also a variety of methods for mounting a vent assembly to a surface structure. As explained above the surface structure may include a ceiling, floor or wall having support elements having wallboard attached thereto. The surface structure illustrated is a ceiling having joists 105 and wallboard 101 attached to the joists. To install the vent system at least one bracket is attached between adjacent joists of the surface structure. An operator may slidably adjust (inward and outward in the direction of double arrowed line B as illustrated in FIGS. 9 and 10) the first part and second parts of the bracket relative to each other so that the brackets are extended between the joists and positioned at the desired location. The operator may also use the horizontal and vertical markings 930, 935 to ensure precise placement of the brackets onto the joist. As illustrated in the figures, the brackets are positioned such that the joist attaching portion of the brackets attach to the joists and to provide a rigid mounting surface for mounting the base plate.

The first and second part of the bracket may also include a notch 915 on opposite ends that serves as a reference point for when adjusting the position and length of the brackets. After the brackets are extended between adjacent joists and positioned at the desired location, fasteners 305 are used to attach the brackets to the joists via a series of openings 925 located on the ends of the bracket. The bracket provides a rigid mounting surface 920 for mounting the base plate, and horizontal 930 and vertical 935 line markings to help ensure precise placement thereon. The rigid mounting surface is offset a certain distance from the joist attaching portion such that when the base plate is attached to rigid mounting surface, the outward facing surface of the cover plate is flush with the outward facing surface of the wallboard. Next, an operator can use fasteners for attaching the joist attaching portions or flanges 931 to the adjacent joists.

Next, the base plate 215 is attached to the at least one bracket. In operation, an operator may use fasteners 305 to attach the base plate to the bracket. Next, an operator could dispose the cover plate 115 within the recess such that it covers a portion of the base plate and is seated such that the outward facing surface of the cover plate is substantially flush with an outward facing edge 323 of the ring portion (as illustrated in FIG. 18, for example). As mentioned above, the magnets or magnetic attracting elements 322 that have been inserted into the slot 805 of the cover plate allows the cover plate to magnetically coupled with the magnets or magnetic attracting elements 321 that have been inserted within the cutouts 1215 of the base plate. It is understood that in certain embodiments the base plate or cover plate may comprise nonmagnetic elements, such as plastic, wood etc. Next, wallboard may be attached to the adjacent joists. Additionally, it is understood that the operator may remove or cut out an opening 315 within the wallboard that is configured for receiving the ring, or mud ring portion of the base plate. In certain embodiments, an operator may also apply adhesive 320 to the adhesive receiving portion 1330 such that the inward facing surface of the wallboard adheres to the adhesive disposed on the adhesive bonding surface or adhesive receiving surface of the flange. Next, an operator may also use fasteners with 310, passing through openings 1220 to further couple the flange of the base plate to the wallboard. In the fully assembled configuration, such that when the wallboard is attached to the joists, the outward facing surface of the cover plate, the outward facing edge of the ring portion and outward facing surface of the wallboard is substantially flush.

Additionally, in other embodiments, an operator may use a masking plate 1110 during the installation process. As mentioned above, the masking plate protects the base plate during the compound application process. A masking plate is typically used to cover holes, or openings on a surface. The masking plate is a copy of the cover plate that is sized and shaped to be received within the recess, and the outer surface seated flush with the wallboard.

After an operator attaches the base plate to the brackets, which are attached to the joists, an operator may dispose the masking plate within the recess in place of the cover plate (as illustrated in FIG. 11A). Disposing the masking plate into the recess may be done prior to disposing the cover plate in the recess. After disposing the masking plate in the recess, wallboard compound or joint compound may be applied such that it extends between at least a portion of the wallboard and the ring portion of the base plate. Applying the joint compound wallboard compound at this point covers the cover any fasteners, seams, or imperfections up to the recess. After the joint compound has been applied and finished, the masking plate is removed from the recess and discarded or stored for an additional use. Thereafter, paint is applied on the wallboard such that it extends between at least a portion of the wallboard and the cover plate to reduce the aesthetic impact of the cover plate being included in the wall as illustrated in FIG. 1.

Next, an operator may mount at least one magnet or magnetic attracting element 322 within at least one slot 805 of the cover plate, each slot being located such that the slot is not visible from the outward facing surface of the cover plate. Next, the operator may also mount at least one mating magnet or magnetic attracting element 321 within the cutout 1215 of the base plate such that when the cover plate is within a certain proximity of the base plate, the base plate and cover plate magnetically couple with each other. However, it can be understood that the step of including the magnet or magnetic attracting element 321 within the cutout of the base plate may occur at an earlier step in the process before the base plate is installed.

Figure 11B:
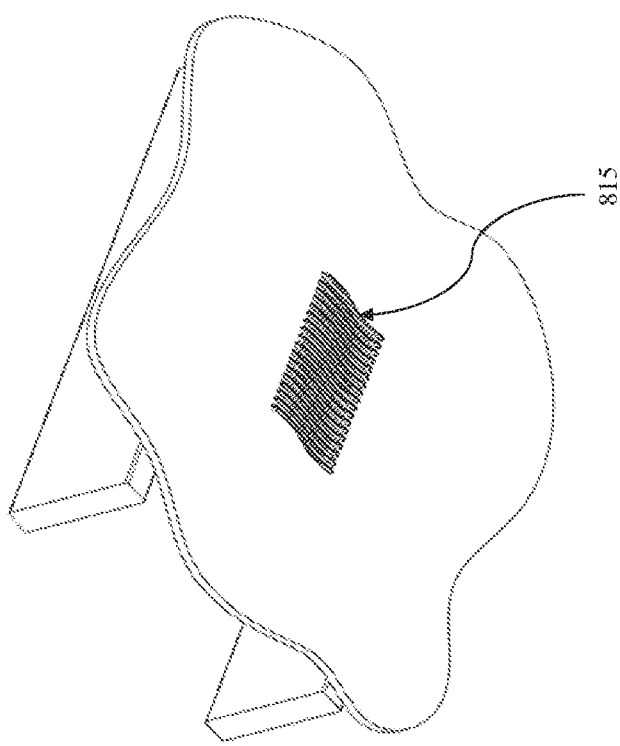
FIG. 11B is a front perspective view of a vent system in the fully assembled configuration in attached with wallboard and joists, according to an example embodiment.

Next, an operator may move the cover plate within proximity to the base plate such that the cover plate magnetically couples with the base plate. After the cover plate is positioned inside the recess and magnetically coupled to the base plate the outward facing surface of the cover plate will be substantially flush with the outward facing surface of the wallboard as illustrated in FIG. 1. Next, optionally and in certain more permanent installations, after the cover plate is substantially flush with the wallboard, the user may apply filler, such as chalk, or wallboard compound, such that the fill extends between the wallboard at least a portion of the cover plate (without affecting the openings of the cover plate). Next, in operator may apply paint such that extends between the wallboard and cover plate such that only the openings on the cover plate are shown as illustrated in FIG. 11B. The finished product provides a substantially smooth, flush, and seamless transition between the wallboard and the cover plate. FIG. 11B illustrates the finished product illustrating the Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A vent system for mounting to a surface structure, the surface structure including a plurality of joists and wallboard attached to the joists, wherein a vent assembly is configured to be in attachment with the vent system and surface structure such that a cover plate of the vent system is substantially flush with an outward facing surface of the wallboard, the vent system comprising:

at least one bracket disposed between adjacent joists of a surface structure;

a base plate having a flange defining an adhesive bonding surface, a ring portion defining a recess, and a cuff;

the cover plate configured to be received within the recess;

at least one magnet supported by the cover plate, wherein the at least one magnet magnetically couples the cover plate to the base plate;

the vent assembly configured to attach to the cuff of the base plate; and, wherein the joists, base plate, and cover plate are sized and shaped such that in an assembled configuration, in which the wallboard is attached to the joists, an outward facing surface of the cover plate is substantially flush with the outward facing surface of the wallboard.

2. The vent system of claim 1, wherein the cover plate includes at least one slot configured to receive at least one magnet, each slot being located such that the slot is not visible from the outward facing surface of the cover plate.

3. The vent system of claim 1, wherein the base plate includes at least one cutout configured to receive at least one element having properties for attaching magnets, each cutout being located such that at least one slot aligns with at least one cutout in the assembled configuration.

4. The vent system of claim 1, wherein at least a portion of the adhesive boding surface is configured for receiving adhesive, wherein the adhesive bonds the flange to an inward facing surface of the wallboard in the assembled configuration.

5. The vent system of claim 1, wherein the at least one bracket includes a first part slidably engaged with a second part such that the first part and second part are slidably mounted with respect to each other to extend between the adjacent joists.

6. The vent system of claim 1, wherein a first set of holes is positioned on a joist attaching portion at the ends of the least one bracket, wherein each of the first set of holes is configured for receiving a first fastener for attaching the at least one bracket to adjacent joists.

7. The vent system of claim 1, wherein the at least one bracket provides a rigid mounting surface, wherein the rigid mounting surface is configured for having the base plate mounted thereon.

8. The vent system of claim 7, wherein the rigid mounting surface is offset from the joint attaching portion such that in the assembled configuration when the base plate is attached to rigid mounting surface, the outward facing surface of the cover plate is flush with outward facing surface of the wallboard.

9. The vent system of claim 1, wherein a second set of holes are spaced along the flange of the base plate, wherein each of the first set of holes is configured for receiving a first fastener configured for attaching the flange to at least the wallboard.

10. The vent system of claim 1, wherein the cover plate having a pattern of a plurality of vent openings for allowing air flow through the vent system.

11. The vent system of claim 1, wherein the at least one bracket provides a rigid mounting surface, wherein the rigid mounting surface is configured for having the base plate mounted thereon.

12. The vent system of claim 11, wherein the rigid mounting surface is offset from the frame element attaching portion such that in the assembled configuration when the base plate is attached to rigid mounting surface, the outward facing surface of the cover plate is flush with outward facing surface of the wallboard.

13. A method for mounting a vent assembly to a surface structure, the surface structure including a plurality of joists and wallboard attached to the joists, wherein the vent assembly is mounted so that an outward facing surface of a cover plate is substantially flush with an outward facing surface of the wallboard, comprising the steps of:
attaching at least one bracket between adjacent joists of the surface structure;
attaching a base plate to the at least one bracket, the base plate having a flange defining an adhesive bonding surface, a ring portion defining a recess, and a cuff;
disposing the cover plate within the recess such that it covers a portion of the base plate and is seated such that the outward facing surface of the cover plate is substantially flush with an outward facing edge of the ring portion;
attaching a wallboard to the adjacent joists, the wallboard having an opening configured to receive the ring portion of the base plate; and,
wherein the at least one bracket, base plate and cover plate are configured such that when the wallboard is attached to the joists, the outward facing surface of the cover plate, the outward facing edge of the ring portion and outward facing surface of the wallboard are substantially flush.

14. The method of claim 13, wherein the method further comprises applying adhesive to the flange such that the adhesive bonds the flange to an inward facing surface of the wallboard.

15. The method of claim 14, wherein the method further comprises:
disposing a masking plate in the recess, prior to disposing the cover plate in the recess; and,
applying wallboard compound such that it extends between at least a portion of the wallboard and the ring portion of the base plate.

16. The method of claim 15, wherein the method further comprises:
removing the mask plate after applying the wallboard compound and prior to disposing the cover plate with the recess; and,
applying paint such that it extends between at least a portion of the wallboard and the cover plate.

17. The method of claim 13, wherein the method further comprises:
mounting at least one magnet within at least one slot of the cover plate, each slot being located such that the slot is not visible from the outward facing surface of the cover plate; and,
moving the cover plate within proximity to the base plate such that the cover plate couples with the base plate.

18. A vent system for mounting to a surface structure, the surface structure including plurality of frame elements and wallboard attached to the frame elements, wherein a vent assembly is configured to be in attachment with the vent system and surface structure such that a cover plate of the vent system is substantially flush with an outward facing surface of the wallboard, the vent system comprising:
at least one bracket disposed between adjacent frame elements of a surface structure;
a base plate having a flange, a ring portion defining a recess, and a cuff;
the cover plate configured to be received within the recess;
the vent assembly configured to attach to the vent assembly receiving portion of the base plate; and,
wherein the frame elements, base plate, and cover plate are sized and shaped such that in an assembled configuration, in which the wallboard is attached to the frame elements, an outward facing surface of the cover plate is substantially flush with the outward facing surface of the wallboard.

19. The vent system of claim 18, wherein the at least one bracket includes a first part slidably engaged with a second part such that the first part and second part and slidably mounted with respect to each other to extend between the adjacent frame elements.

20. The vent system of claim 19, wherein a first set of holes is positioned on a frame element attaching portion at the ends of the least one bracket, wherein each of the first set of holes is configured for receiving a first fastener for attaching the at least one bracket to adjacent frame elements.

* * * * *